United States Patent
Zhang et al.

(10) Patent No.: US 11,991,122 B2
(45) Date of Patent: May 21, 2024

(54) TECHNIQUES FOR APPLICATION TIME FOR SLOT FORMAT UPDATING ASSOCIATED WITH HALF DUPLEX AND FULL DUPLEX MODE SWITCHING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/304,430

(22) Filed: Jun. 21, 2021

(65) Prior Publication Data
US 2022/0407668 A1    Dec. 22, 2022

(51) Int. Cl.
*H04L 5/14*     (2006.01)
*H04W 72/23*    (2023.01)

(52) U.S. Cl.
CPC .............. *H04L 5/14* (2013.01); *H04W 72/23* (2023.01)

(58) Field of Classification Search
CPC ......... H04L 5/14; H04L 5/001; H04L 5/0091; H04L 5/16; H04W 72/042
See application file for complete search history.

(56) References Cited

U.S. PATENT DOCUMENTS

| | | | | |
|---|---|---|---|---|
| 2002/0038370 A1* | 3/2002 | Demoto | ............. | H04L 12/5692 |
| | | | | 709/227 |
| 2012/0093089 A1* | 4/2012 | Park | ..................... | H04B 7/0626 |
| | | | | 370/328 |
| 2018/0162295 A1* | 6/2018 | Honda | .................... | H04L 12/28 |
| 2019/0045495 A1* | 2/2019 | Chen | ..................... | H04L 5/0044 |
| 2019/0190761 A1* | 6/2019 | Liu | ......................... | H04L 5/0007 |
| 2020/0228196 A1 | 7/2020 | John Wilson et al. | | |
| 2020/0404646 A1* | 12/2020 | Zhang | ............... | H04W 72/0446 |
| 2021/0176626 A1* | 6/2021 | Abdelghaffar | ........ | H04W 76/27 |
| 2021/0219187 A1* | 7/2021 | Lee | ........................ | H04W 4/40 |

FOREIGN PATENT DOCUMENTS

| | | |
|---|---|---|
| EP | 3737137 A1 | 11/2020 |
| WO | 2020040530 A1 | 2/2020 |

OTHER PUBLICATIONS

International Search Report and Written Opinion—PCT/US2022/072489—ISA/EPO—dated Sep. 5, 2022.

* cited by examiner

*Primary Examiner* — Rasheed Gidado
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive information indicating a first slot format, wherein the information indicates one or more symbols associated with a full duplex (FD) format. The UE may perform communication based on a second slot format until a time period after the reception of the information indicating the first slot format, wherein the second slot format is prior to the first slot format. The UE may perform at least one of half duplex (HD) communication or FD communication in accordance with the first slot format after the time period has elapsed. Numerous other aspects are described.

30 Claims, 9 Drawing Sheets

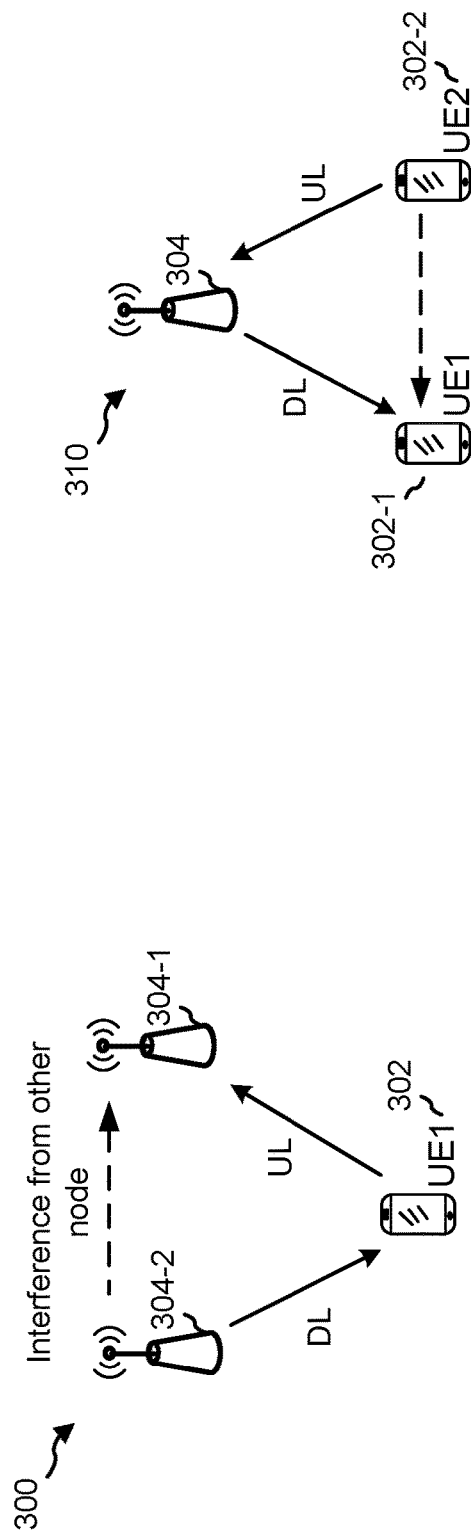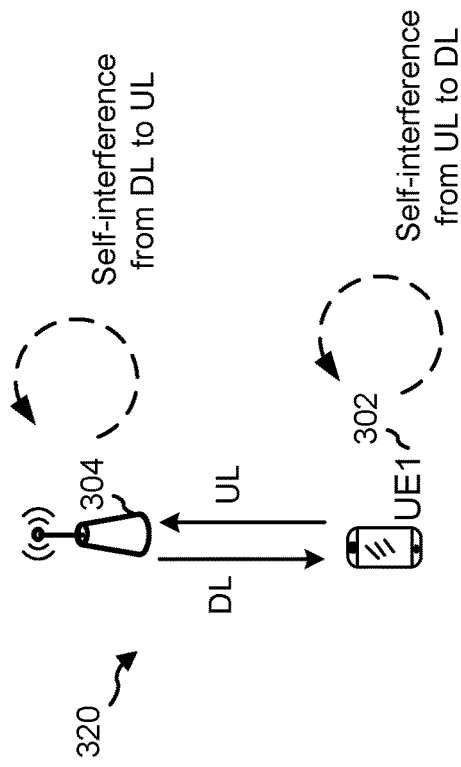
FIG. 3B
FIG. 3C
FIG. 3A

TECHNIQUES FOR APPLICATION TIME FOR SLOT FORMAT UPDATING ASSOCIATED WITH HALF DUPLEX AND FULL DUPLEX MODE SWITCHING

FIELD OF THE DISCLOSURE

Aspects of the present disclosure generally relate to wireless communication and to techniques and apparatuses for application time for slot format updating associated with half duplex and full duplex mode switching.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving information indicating a first slot format, wherein the information indicates one or more symbols associated with a full duplex (FD) format. The method may include performing communication based on a second slot format until a time period after the reception of the information indicating the first slot format, wherein the second slot format is prior to the first slot format. The method may include performing at least one of half duplex (HD) communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: performing the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the communication until the time period has elapsed is in accordance with the second slot format from before the information indicating the first slot format was received.

In some aspects, the method includes receiving, from a base station, information configuring the time period.

In some aspects, the method includes transmitting capability information indicating a capability relating to the FD communication, wherein the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the method includes transmitting the acknowledgment, wherein the acknowledgment is a UE-specific acknowledgment for the information indicating the first slot format.

In some aspects, the method includes transmitting the acknowledgment on a resource associated with common feedback regarding the information indicating the first slot format.

In some aspects, the information indicating the first slot format is received on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information received on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to a method of wireless communication performed by a base station. The method may include transmitting, to a UE, information indicating a first slot format, wherein the information indicates one or more symbols associated with an FD format. The method may include performing communication based on a second slot format until a time period after reception of the information indicating the first slot format by the UE, wherein the second slot format is prior to the first slot format. The method may include performing at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: performing the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the HD communication until the time period has elapsed is in accordance with the second slot format from before the information indicating the first slot format was received by the UE.

In some aspects, the method includes transmitting information configuring the time period.

In some aspects, the method includes receiving capability information indicating a capability relating to the FD communication, wherein the information configuring the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the method includes receiving the acknowledgment, wherein the acknowledgment is a UE-specific acknowledgment for the information indicating the first slot format.

In some aspects, the method includes receiving the acknowledgment on a resource associated with common feedback regarding the information indicating the first slot format.

In some aspects, the information indicating the first slot format is transmitted on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information transmitted on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to an apparatus of a UE for wireless communication. The apparatus may include a memory. The apparatus may include one or more processors, coupled to the memory, configured to receive information indicating a first slot format, where the information indicates one or more symbols associated with an FD format perform communication based on a second slot format until a time period after the reception of the information indicating the first slot format, where the second slot format is prior to the first slot format perform at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: perform the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the communication until the time period has elapsed is in accordance with the second slot format from before the information indicating the first slot format was received.

In some aspects, the one or more processors are further configured to receive, from a base station, information configuring the time period.

In some aspects, the one or more processors are further configured to transmit capability information indicating a capability relating to the FD communication, wherein the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the one or more processors are further configured to transmit the acknowledgment, wherein the acknowledgment is a UE-specific acknowledgment for the information indicating the first slot format.

In some aspects, the one or more processors are further configured to transmit the acknowledgment on a resource associated with common feedback regarding the information indicating the first slot format.

In some aspects, the information indicating the first slot format is received on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information received on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to an apparatus of a base station for wireless communication. The apparatus may include a memory. The apparatus may include one or more processors, coupled to the memory, configured to transmit, to a UE, information indicating a first slot format, where the information indicates one or more symbols associated with an FD format perform communication based on a second slot format until a time period after reception of the information indicating the first slot format by the UE, where the second slot format is prior to the first slot format perform at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: perform the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the HD communication until the time period has elapsed is in accordance with the second slot format from before the information indicating the first slot format was received by the UE.

In some aspects, the one or more processors are further configured to transmit information configuring the time period.

In some aspects, the one or more processors are further configured to receive capability information indicating a capability relating to the FD communication, wherein the information configuring the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the one or more processors are further configured to receive the acknowledgment, wherein the acknowledgment is a UE-specific acknowledgment for the information indicating the first slot format.

In some aspects, the one or more processors are further configured to receive the acknowledgment on a resource associated with common feedback regarding the information indicating the first slot format.

In some aspects, the information indicating the first slot format is transmitted on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information transmitted on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to a non-transitory computer-readable medium that stores a set of instructions for wireless communication by a UE. The set of instructions, when executed by one or more processors of the UE, may cause the UE to receive information indicating a first slot format, wherein the information indicates one or more symbols associated with an FD format. The set of instructions, when executed by one or more processors of the UE, may cause the UE to perform communication based on a second slot format until a time period after the reception of the information indicating the first slot format, wherein the second slot format is prior to the first slot format. The set of instructions, when executed by one or more processors of the UE, may cause the UE to perform at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: perform the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the communication until the time period has elapsed is in accordance with the second slot format from before the information indicating the first slot format was received.

In some aspects, the one or more instructions further cause the apparatus to receive, from a base station, information configuring the time period.

In some aspects, the one or more instructions further cause the apparatus to transmit capability information indicating a capability relating to the FD communication, wherein the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the one or more instructions further cause the apparatus to transmit the acknowledgment, wherein the acknowledgment is a UE-specific acknowledgment for the information indicating the first slot format.

In some aspects, the one or more instructions further cause the apparatus to transmit the acknowledgment on a resource associated with common feedback regarding the information indicating the first slot format.

In some aspects, the information indicating the first slot format is received on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information received on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to a non-transitory computer-readable medium that stores a set of instructions for wireless communication by a base station. The set of instructions, when executed by one or more processors of the base station, may cause the base station to transmit, to a UE, information indicating a first slot format, wherein the information indicates one or more symbols associated with an FD format. The set of instructions, when executed by one or more processors of the base station, may cause the base station to perform communication based on a second slot format until a time period after reception of the information indicating the first slot format by the UE, wherein the second slot format is prior to the first slot format. The set of instructions, when executed by one or more processors of the base station, may cause the base station to perform at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: perform the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the HD communication until the time period has elapsed is in accordance with the second slot format from before the information indicating the first slot format was received by the UE.

In some aspects, the one or more instructions further cause the apparatus to transmit information configuring the time period.

In some aspects, the one or more instructions further cause the apparatus to receive capability information indicating a capability relating to the FD communication, wherein the information configuring the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the one or more instructions further cause the apparatus to receive the acknowledgment, wherein the acknowledgment is a UE-specific acknowledgment for the information indicating the first slot format.

In some aspects, the one or more instructions further cause the apparatus to receive the acknowledgment on a resource associated with common feedback regarding the information indicating the first slot format.

In some aspects, the information indicating the first slot format is transmitted on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information transmitted on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to an apparatus of a UE for wireless communication. The apparatus may include means for receiving information indicating a first slot format, wherein the information indicates one or more symbols associated with an FD format. The apparatus may include means for performing communication based on a second slot format until a time period after the reception of the information indicating the first slot format, wherein the second slot format is prior to the first slot format. The apparatus may include means for performing at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: means for performing the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the communication until the time period has elapsed is in accordance with the second slot format from before the information indicating the first slot format was received.

In some aspects, the apparatus includes means for receiving, from a base station, information configuring the time period.

In some aspects, the apparatus includes means for transmitting capability information indicating a capability relating to the FD communication, wherein the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the apparatus includes means for transmitting the acknowledgment, wherein the acknowledgment is a UE-specific acknowledgment for the information indicating the first slot format.

In some aspects, the apparatus includes means for transmitting the acknowledgment on a resource associated with common feedback regarding the information indicating the first slot format.

In some aspects, the information indicating the first slot format is received on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information received on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Some aspects described herein relate to an apparatus of a base station for wireless communication. The apparatus may include means for transmitting, to a UE, information indicating a first slot format, wherein the information indicates one or more symbols associated with an FD format. The apparatus may include means for performing communication based on a second slot format until a time period after reception of the information indicating the first slot format by the UE, wherein the second slot format is prior to the first slot format. The apparatus may include means for performing at least one of HD communication or FD communication in accordance with the first slot format after the time period has elapsed.

In some aspects, the information indicating the first slot format includes a slot format indicator in a group common downlink control information message.

In some aspects, the information indicating the first slot format is associated with a bandwidth part switch with a slot format change in UE dedicated downlink control information.

In some aspects, the first slot format is applied starting at a slot in which the information indicating the first slot format is received, the one or more symbols associated with the FD format are to be transmitted via one or more slots that occur, in time, before the time period has elapsed, and performing the HD communication further comprises: means for performing the HD communication in the one or more slots based at least in part on the time period not having elapsed.

In some aspects, the time period is associated with preparing the UE for the FD communication.

In some aspects, the time period is defined as at least one of: a first time period associated with a downlink control information decoding process, a second time period associated with uplink transmission preparation, a third time period associated with preparing the UE for the FD communication, or a fourth time period associated with a bandwidth part switch time.

In some aspects, the time period is selected as a longest time period of the first time period, the second time period, the third time period, or the fourth time period.

In some aspects, performing the HD communication until the time period has elapsed is in accordance with the second slot format from before the information indicating the first slot format was received by the UE.

In some aspects, the apparatus includes means for transmitting information configuring the time period.

In some aspects, the apparatus includes means for receiving capability information indicating a capability relating to the FD communication, wherein the information configuring the time period is based at least in part on the capability information.

In some aspects, the capability relates to a mode switching latency for an FD mode.

In some aspects, the mode switching latency is measured as a length of time after receiving the information indicating the first slot format.

In some aspects, the mode switching latency is measured from transmission of an acknowledgment associated with the information indicating the first slot format.

In some aspects, the apparatus includes means for receiving the acknowledgment, wherein the acknowledgment is a UE-specific acknowledgment for the information indicating the first slot format.

In some aspects, the apparatus includes means for receiving the acknowledgment on a resource associated with common feedback regarding the information indicating the first slot format.

In some aspects, the information indicating the first slot format is transmitted on a carrier on which the FD communication and the HD communication are performed, and the time period is measured using one of: a first subcarrier spacing associated with a downlink of the FD communication or the HD communication, or a second subcarrier spacing associated with an uplink of the FD communication or the HD communication.

In some aspects, the information indicating the first slot format is included in downlink control information transmitted on a first carrier and the FD communication and the HD communication are performed on a second carrier, and the time period is measured using one of: a first subcarrier spacing associated with a downlink of the FD communication or the HD communication, a second subcarrier spacing associated with an uplink of the FD communication or the HD communication, or a third subcarrier spacing of the downlink control information.

In some aspects, the time period is measured using a smallest or a largest subcarrier spacing of the first subcarrier spacing, the second subcarrier spacing, or the third subcarrier spacing.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
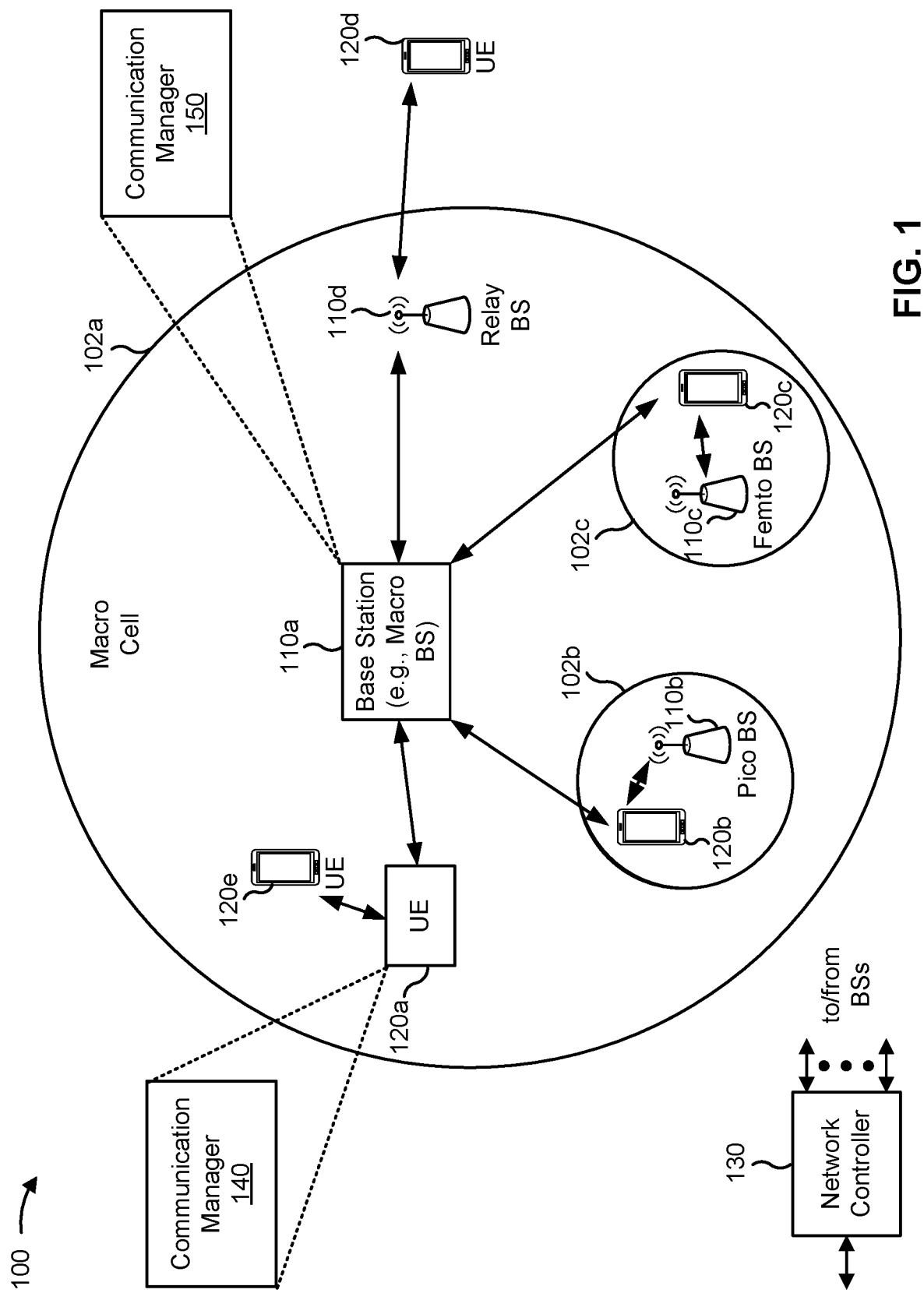
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations relating to application time for slot format updating associated with half duplex (HD) and full duplex (FD) mode switching. Additionally, or alternatively, the communication manager 140 may perform one or more other operations described herein.

In some aspects, the base station 110 may include a communication manager 150. As described in more detail elsewhere herein, the communication manager 150 may perform one or more operations relating to application time for slot format updating associated with HD and FD mode switching. Additionally, or alternatively, the communication manager 150 may perform one or more other operations described herein.

As indicated above, FIG. 1 is provided as an example. Other examples may differ from what is described with regard to FIG. 1.

Figure 2:
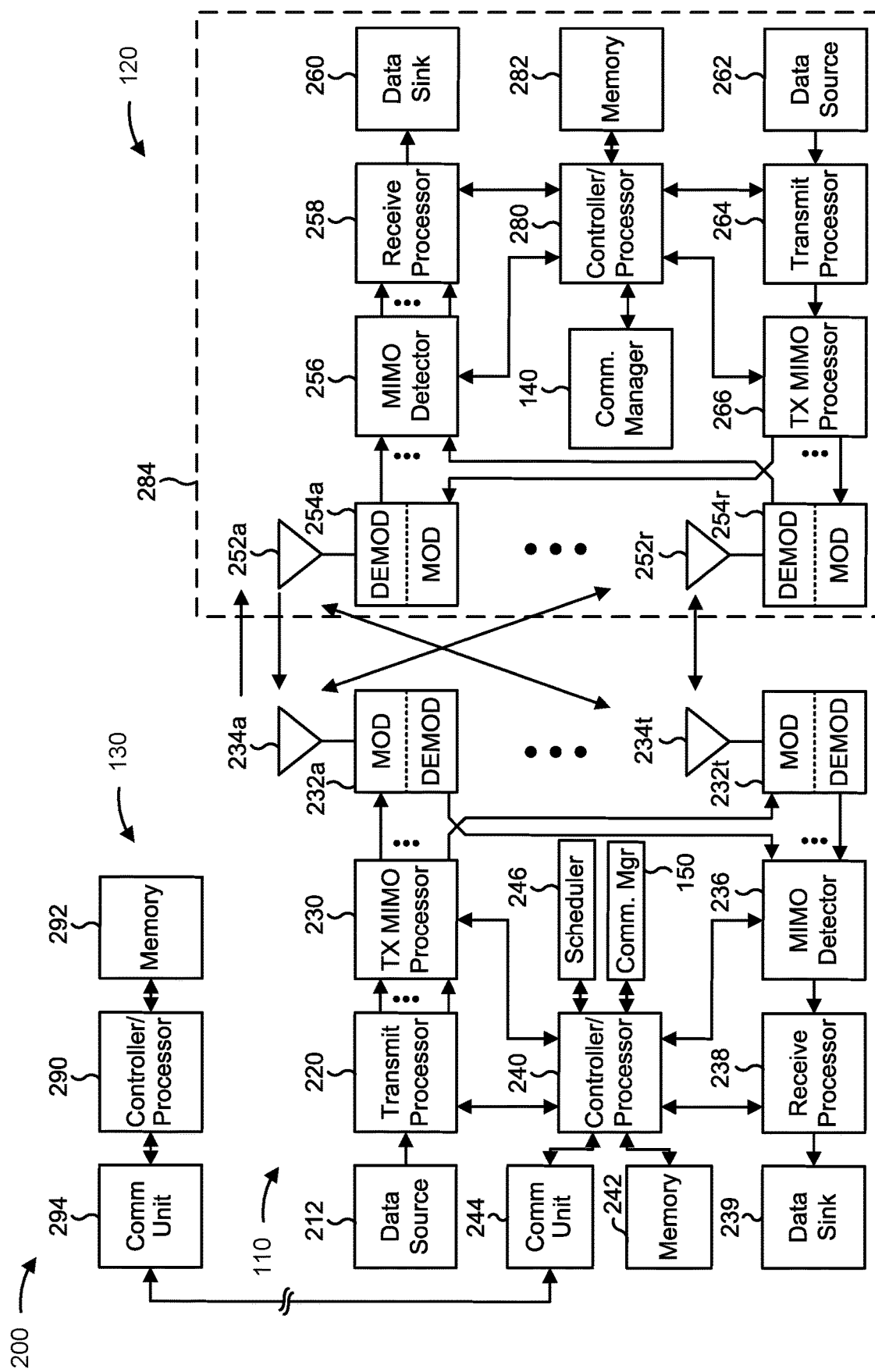
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with application update associated with HD and FD mode switching, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, UE 120 may include means for receiving information indicating a first slot format, wherein the information indicates one or more symbols associated with an FD format, means for performing communication based on a second slot format until a time period after the reception of the information indicating the first slot format, wherein the second slot format is prior to the first slot format, means for performing at least one of HD communication or FD communication in accordance with the first slot format after the time period has elapsed, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, base station 110 may include means for transmitting, to a UE, information indicating a first slot format, wherein the information indicates one or more symbols associated with an FD format, means for performing communication based on a second slot format until a time period after reception of the information indicating the first slot format by the UE, wherein the second slot format is prior to the first slot format, means for performing at least one of HD communication or FD communication in accordance with the first slot format after the time period has elapsed, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of FD communication in accordance with the present disclosure. An FD communication is a communication that utilizes overlapped time resources at a single node for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indication (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source.

The example 300 of FIG. 3A includes a UE1 302 and two base stations (e.g., TRPs) 304-1, 304-2, wherein the UE1 302 is sending uplink (UL) transmissions to base station 304-1 and is receiving downlink (DL) transmissions from base station 304-2. In the example 300 of FIG. 3A, FD is enabled for the UE1 302, but not for the base stations 304-1, 304-2. Thus, the base stations 304-1 and 304-2 are half duplex base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. Thus, the UEs UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

In FIGS. 3A-3C, interference is indicated by dashed lines. Interference can occur between nodes of examples 300, 310, 320 (referred to as "cross-link interference"). Examples of cross-link interference are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 302 (from an uplink transmission to a downlink reception) and at a base station 304 (from a downlink transmission to an uplink reception) are shown in FIG. 3C. It should be noted that the above-described cross-link interference and self-interference conditions can occur in half duplex deployments and in full duplex deployments.

As indicated above, FIGS. 3A-3C are provided as one or more examples. Other examples may differ from what is described with regard to FIGS. 3A-3C.

A UE and a base station may communicate with each other via a wireless connection such as an air interface connection. For example, the UE and the base station may perform uplink communication and/or downlink communication. Generally, a data payload that is to be transmitted by a UE or a base station may be packaged in a transport block (TB). A TB is a payload that is passed from a medium access control (MAC) layer to a physical layer for transmission via a shared data channel (such as a physical downlink shared channel (PDSCH) or a physical uplink shared channel (PUSCH)). A TB may undergo physical layer processing before being mapped onto a shared data channel for transmission over the wireless connection. For example, a cyclic redundancy check (CRC) may be added to the transport block, and then the transport block may be segmented into codeblocks (which may have their own CRCs) and transmitted via the wireless connection.

FD communication (described above) may enable simultaneous uplink/downlink transmission in some frequency ranges, such as FR 2. An FD capability can be present at the base station, the UE, or both. For example, at the UE, an uplink transmission can be from one panel and a downlink reception can use another panel. As another example, at the base station, the uplink reception can use one panel and the downlink transmission can be from a second panel. In some cases, an FD capability may be conditional on, for example, beam separation, self-interference, clutter echo, or the like. FD communication may provide latency reduction, spectrum efficiency enhancement (such as per cell and per UE), and more efficient resource utilization.

A communication (such as a PDSCH or a PUSCH) may be scheduled by scheduling information. For example, downlink control information (DCI), which may be transmitted via a physical downlink control channel (PDCCH), may carry the scheduling information. Scheduling information notifies a UE of resources on which to transmit a PUSCH or on which to receive a PDSCH, as well as parameters used for such transmission or reception.

In some cases, DCI may indicate a slot format associated with one or more slots. For example, DCI may indicate a slot format for scheduled resources. A slot format indicates whether one or more symbols of one or more slots are to be used as downlink symbols (in which downlink communication occurs), uplink symbols (in which uplink communication occurs), flexible symbols (in which downlink and uplink communications can both occur), or the like. In some aspects, a slot format may indicate whether one or more symbols of one or more slots are associated with an HD format (e.g., to be used for HD communications) or an FD format (e.g., to be used for FD communications). For example, the parameters may indicate that one or more symbols of one or more slots currently associated with an HD format are to be associated with an FD format. However, the one or more slots may occur, in time, prior to the UE being able to transmit data according to the FD format. For example, it may take some amount of time for the UE to prepare for FD communication, such as to activate a second antenna panel for FD communication. In this case, the UE may not be able to transmit data via the one or more slots if the slot format is applied immediately after receiving DCI indicating the slot format, thereby failing to utilize resources allocated to the UE.

Some techniques and apparatuses described herein enable an updated slot format to be utilized after expiration of a time period (sometimes referred to as an application time) that is configured to provide a UE sufficient preparation time for performing a communication in accordance with the updated slot format. For example, a UE may perform communication in accordance with a current slot format. The UE may receive information indicating an updated slot format. The UE may continue performing communication in accordance with the current slot format until a time period after the reception of the information indicating the updated slot format has elapsed. The time period may be defined based at least in part on a time period associated with a DCI decoding process, a time period associated with uplink transmission preparation, a time period associated with preparing the UE for the FD communication, and/or a time period associated with a bandwidth part switch time, among other examples. The UE may perform communication in accordance with the updated slot format after the time period has elapsed. In this way, the impact of switching a slot format to one that the UE is incapable of using before the time period has elapsed is reduced or eliminated, which improves UE performance, reduces the occurrence of dropped communications, and increases throughput.

Figure 4:
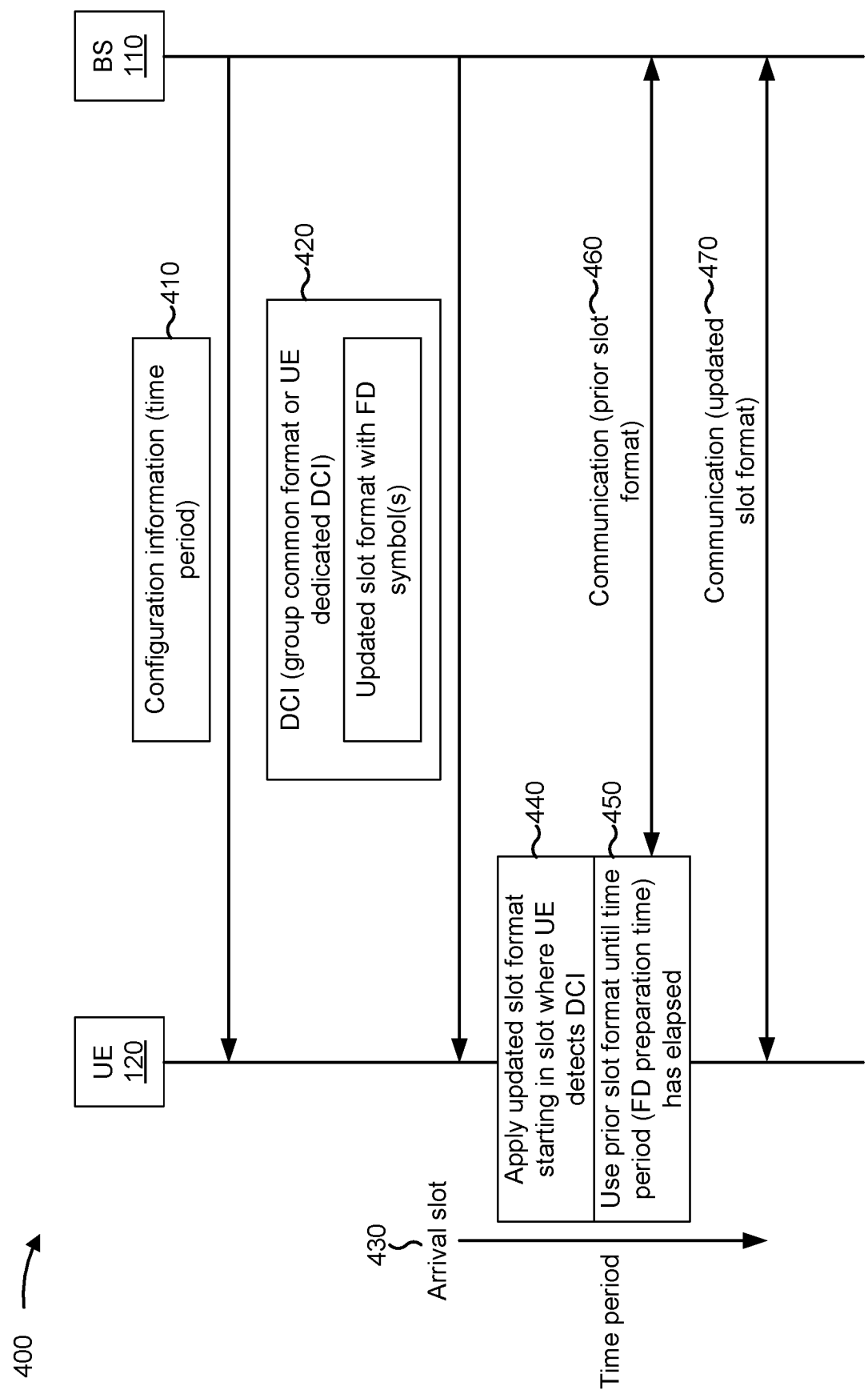
FIGS. 4 and 5 are diagrams illustrating examples associated with application time for slot format update associated with half duplex (HD) and FD mode switching, in accordance with the present disclosure.

FIG. 4 is a diagram illustrating an example 400 associated with application time for slot format update associated with HD and FD mode switching, in accordance with the present disclosure. As shown in FIG. 4, a base station 110 and a UE 120 may communicate with one another.

As shown by reference number 410, the UE 120 may receive configuration information from the base station 110. The configuration information may indicate a time period associated with updating a slot format. The time period may be associated with an amount of time associated with the UE 120 transitioning from performing communication according to a current slot format to performing communication according to an updated slot format, as described in greater detail elsewhere herein. In some aspects, In some aspects, the time period is associated with a DCI decoding process. For example, the time period may correspond to a length of time associated with the UE 120 decoding a received DCI (such as in terms of slots and/or symbols).

In some aspects, the time period is associated with a bandwidth part switch time. For example, the time period may correspond to a length of time associated with the UE 120 performing a bandwidth part switch process. In some aspects, the length of time may be based at least in part on a time from receiving DCI indicating a bandwidth part switch to the UE performing the switch.

In some aspects, the time period is associated with uplink transmission preparation. For example, the time period may correspond to a length of time associated with the UE 120 preparing to perform an uplink transmission, such as a length of time (e.g., a shortest length of time) between receiving DCI scheduling an uplink transmission and the UE 120 being prepared to transmit the uplink transmission).

In some aspects, the time period is associated with preparing the UE 120 for performing communication according to the updated slot format. For example, the time period may be associated with an amount of time associated with the UE 120 transitioning from performing communication according to a current slot format (e.g., a slot format associated with HD communication) to performing communication according to the updated slot format (e.g., a slot format associated with FD communication). For example, the time period may be associated with an amount of time required by the UE 120 to enter an FD mode (e.g., when starting from an HD mode).

In some aspects, the time period is associated with the longest of the length of time associated with the DCI decoding process, the length of time associated with uplink transmission preparation, the length of time associated with preparing the UE 120 for performing FD communication, and the length of time associated with a bandwidth part switch time. Alternatively, and/or additionally, the UE 120 may determine the time period. In some aspects, the UE 120 may determine the time period in a manner similar to that described elsewhere herein with respect to the base station 110 determining the time period. In some aspects, the UE 120 may receive information indicating the time period, such as via radio resource control (RRC) signaling or the like. Additionally, or alternatively, the DCI that provides the updated slot format may indicate the time period. In some aspects, the time period may be based at least in part on a capability of the UE, such as a capability of the UE associated with one or more of the factors described above.

In some aspects, as shown by reference number 420, the UE 120 may receive the information indicating the updated slot format via DCI. In some aspects, the DCI may include group common DCI (e.g., DCI Format 2_0). The group common DCI may indicate the updated slot format and/or one or more symbols (e.g., one or more FD symbols, as shown in FIG. 4) associated with the updated slot format. In some aspects, the DCI may include UE dedicated DCI. The UE dedicated DCI may include a bandwidth part switch with a slot format change that is associated with the updated slot format.

In some aspects, as shown by reference number 430, the UE 120 may determine a start of the time period indicated by the configuration information received from the base station 110 based at least in part on receiving the information indicating the updated slot format (e.g., based at least in part on receiving the DCI). For example, the UE 120 may determine the start of the time period as corresponding to a time associated with a slot where the UE 120 detects DCI indicating the updated slot format.

In some aspects, the time period may be measured based at least in part on a carrier on which the information indicating the updated slot format is received. As an example, the information indicating the updated slot format may be received on a carrier on which the UE 120 is performing a communication according to a current slot format (e.g., a slot format associated with performing HD communication) and on which the UE 120 will perform a communication according to the updated slot format (e.g., a slot format associated with performing FD communication). In other words, the DCI may indicate a slot format for a carrier on which the DCI is received. The time period may be measured using a subcarrier spacing associated with a downlink of the HD communication (e.g., the communication performed according to the current slot format), a subcarrier spacing associated with a downlink of the FD communication (e.g., the communication according to the updated slot format), a subcarrier spacing associated with an uplink of the HD communication, or a subcarrier spacing associated with an uplink of the FD communication. For example, if the DCI, the FD communication, and the HD communication are on the same carrier, the time period may be determined based at least in part on a downlink subcarrier spacing of the carrier or an uplink subcarrier spacing of the carrier. If the DCI is on a different carrier than the FD communication and/or the HD communication, then the time period may be determined based at least in part on at least one of a subcarrier spacing of the DCI, a downlink subcarrier spacing of the FD/HD communication's carrier, or an uplink subcarrier spacing of the FD/HD communication's carrier. In some aspects, the time period may use a shortest subcarrier spacing of each of the subcarrier spacings described above.

In some implementations, the time period may be measured based at least in part on a timer. The UE 120 may initiate a timer based at least in part on receiving the information indicating the updated slot format. The timer may be associated with the time period indicated by the configuration information and an expiration of the timer may indicate that the time period has elapsed.

In some aspects, the UE 120 may apply the updated slot format based at least in part on receiving the information indicating the updated slot format. For example, as shown by reference number 440, the UE 120 may apply the updated slot format starting in a slot where the UE 120 detects DCI indicating the updated slot format.

As shown by reference number 450, the UE 120 may use a prior slot format (e.g., the slot format used by the UE 120 prior to applying the updated slot format) until the time period indicated in the configuration information has elapsed. In some aspects, as shown by reference number 460, the UE 120 may perform a communication in accordance with the prior slot format during the time period.

As an example, the information indicating the updated slot format may indicate that one or more slots currently associated with the HD format are to be associated with the FD format. The updated slot format may be applied starting at a slot in which the information indicating the updated format is received and the one or more slots may be before the time period has elapsed. The UE 120 may perform an HD communication in the one or more slots based at least in part on the time period not having elapsed.

Subsequently, the UE 120 may determine that the time period has elapsed. As shown by reference number 470, the UE 120 may perform a communication in accordance with the updated slot format based at least in part on the time period having elapsed.

As indicated above, FIG. 4 is provided as an example. Other examples may differ from what is described with respect to FIG. 4.

Figure 5:
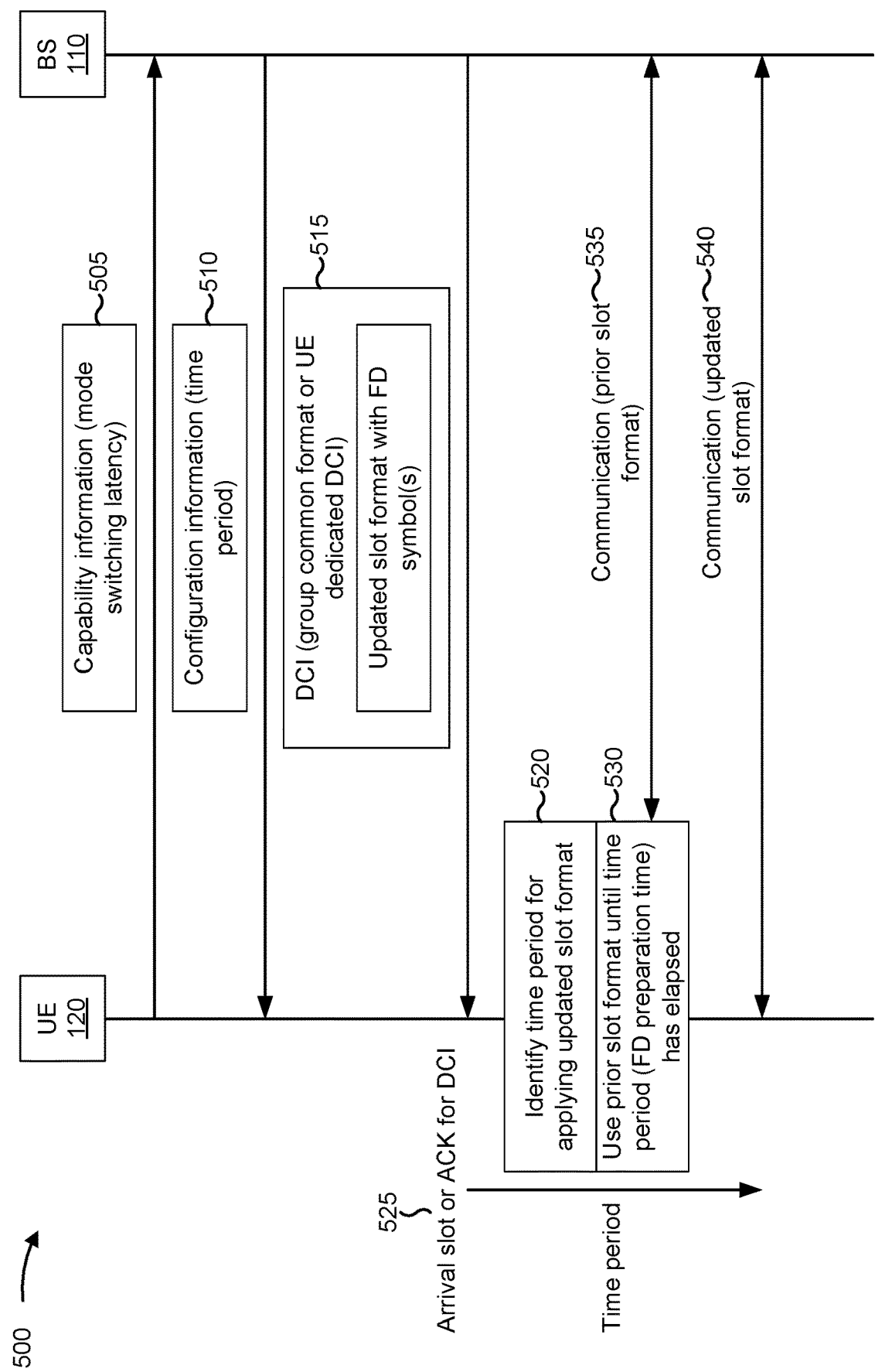

FIG. 5 is a diagram illustrating an example 500 associated with application time for slot format update associated with HD and FD mode switching, in accordance with the present disclosure. As shown in FIG. 5, a base station 110 and a UE 120 may communicate with one another.

As shown by reference number 505, the UE 120 may provide capability information indicating a capability of the UE 120 to the base station 110. In some aspects, the capability information may be associated with performing FD communication. For example, as shown in FIG. 5, the capability of the UE 120 may be associated with a mode switching latency. In some aspects, the mode switching latency may be associated with switching from an HD mode associated with performing HD communication to an FD mode associated with performing FD communication.

In some aspects, the mode switching latency may be measured as a length of time after receiving information indicating an updated slot format. In some aspects, the mode switching latency may be measured from transmission of an acknowledgment associated with receiving the information indicating the updated slot format. For example, the UE 120 may receive the information indicating the updated slot format in group common DCI. The UE 120 may transmit a UE-specific acknowledgement for the information indicating the updated slot format. The mode switching latency may be measured from a time at which the UE-specific acknowledgement was transmitted until a time at which the UE 120 is able to perform FD communication.

In some aspects, the acknowledgement may be transmitted on a resource associated with common feedback regarding the information indicating the updated slot format. For example, as shown by reference number 515, the information indicating the updated slot format may be included in DCI. In some aspects, the DCI includes group common DCI and the UE 120 may transmit the acknowledgement via a set of shared resources associated with transmitting acknowledgements and/or negative acknowledgements associated with receiving the group common DCI.

As shown by reference number 510, the UE 120 may receive configuration information from the base station 110. The UE 120 may receive the configuration based at least in part on providing the capability information to the base station 110. The configuration information may indicate a time period associated with updating a slot format. The time period may be associated with an amount of time associated with the UE 120 transitioning from performing communication according to a current slot format to performing communication according to an updated slot format, as described in greater detail elsewhere herein.

The base station 110 may determine the time period based at least in part on the capability information received from the UE 120. In some aspects, the capability information indicates the mode switching latency associated with the UE 120. The base station 110 may determine the time period based at least in part on the mode switching latency associated with the UE 120. For example, the base station 110 may determine the time period as being equal to or greater than an amount of time corresponding to the mode switching latency of the UE 120.

Alternatively, and/or additionally, the UE 120 may determine the time period. In some aspects, the UE 120 may determine the time period in a manner similar to that described elsewhere herein with respect to the base station 110 determining the time period.

In some aspects, the UE 120 may receive information indicating an updated slot format. In some aspects, the updated slot format may be associated with one or more resources scheduled for the UE 120. For example, the UE 120 may receive information indicating one or more symbols and/or one or more slots associated with an FD format and/or one or more symbols and/or one or more slots associated with an HD format.

As shown by reference number 515, the UE 120 may receive DCI indicating an updated slot format associated with one or more FD symbols and/or one or more slots. In some aspects, the DCI may include group common DCI. The group common DCI may indicate the updated slot format and/or one or more symbols (e.g., one or more FD symbols, as shown in FIG. 4) associated with the updated slot format. In some aspects, the DCI may include UE dedicated DCI. The UE dedicated DCI may include a bandwidth part switch with a slot format change that is associated with the updated slot format.

As shown by reference number 520, the UE 120 may identify a time period for applying the updated slot format. For example, as shown by reference number 525, the UE 120 may determine a start of the time period indicated by the configuration information received from the base station 110 based at least in part on receiving the information indicating the updated slot format (e.g., based at least in part on receiving the DCI). For example, the UE 120 may determine the start of the time period as corresponding to a time associated with a slot where the UE 120 detects DCI indicating the updated slot format. As another example, the UE 120 may determine the start of the time period as corresponding to a time associated with transmitting an acknowledgment associated with receiving the DCI indicating the updated slot format.

In some aspects, the UE 120 may apply the updated slot format based at least in part on receiving the information indicating the updated slot format. For example, the UE 120 may apply the updated slot format starting in a slot where the UE 120 detects DCI indicating the updated slot format.

As shown by reference number 530, the UE 120 may use a prior slot format (e.g., the slot format used by the UE 120 prior to applying the updated slot format) until the time period indicated in the configuration information has elapsed. In some aspects, as shown by reference number 535, the UE 120 may perform a communication in accordance with the prior slot format during the time period. In one example, the UE 120 may receive a prior slot format indication (SFI) indicating a slot format to use in the next 100 slots. In slot #98 of the next 100 slots, the UE 120 monitors and receives a new SFI. In this example, the overlapped slots #98-100 are expected to receive the same slot formats as indicated by the prior SFI.

As an example, the information indicating the updated slot format may indicate that one or more slots currently associated with the HD format are to be associated with the FD format. The updated slot format may be applied starting at a slot in which the information indicating the updated format is received and the one or more slots may be before the time period has elapsed. The UE 120 may perform an HD communication in the one or more slots based at least in part on the time period not having elapsed.

Subsequently, the UE 120 may determine that the time period has elapsed. As shown by reference number 540, the UE 120 may perform a communication in accordance with the updated slot format based at least in part on the time period having elapsed.

As indicated above, FIG. 5 is provided as an example. Other examples may differ from what is described with respect to FIG. 5.

Figure 6:
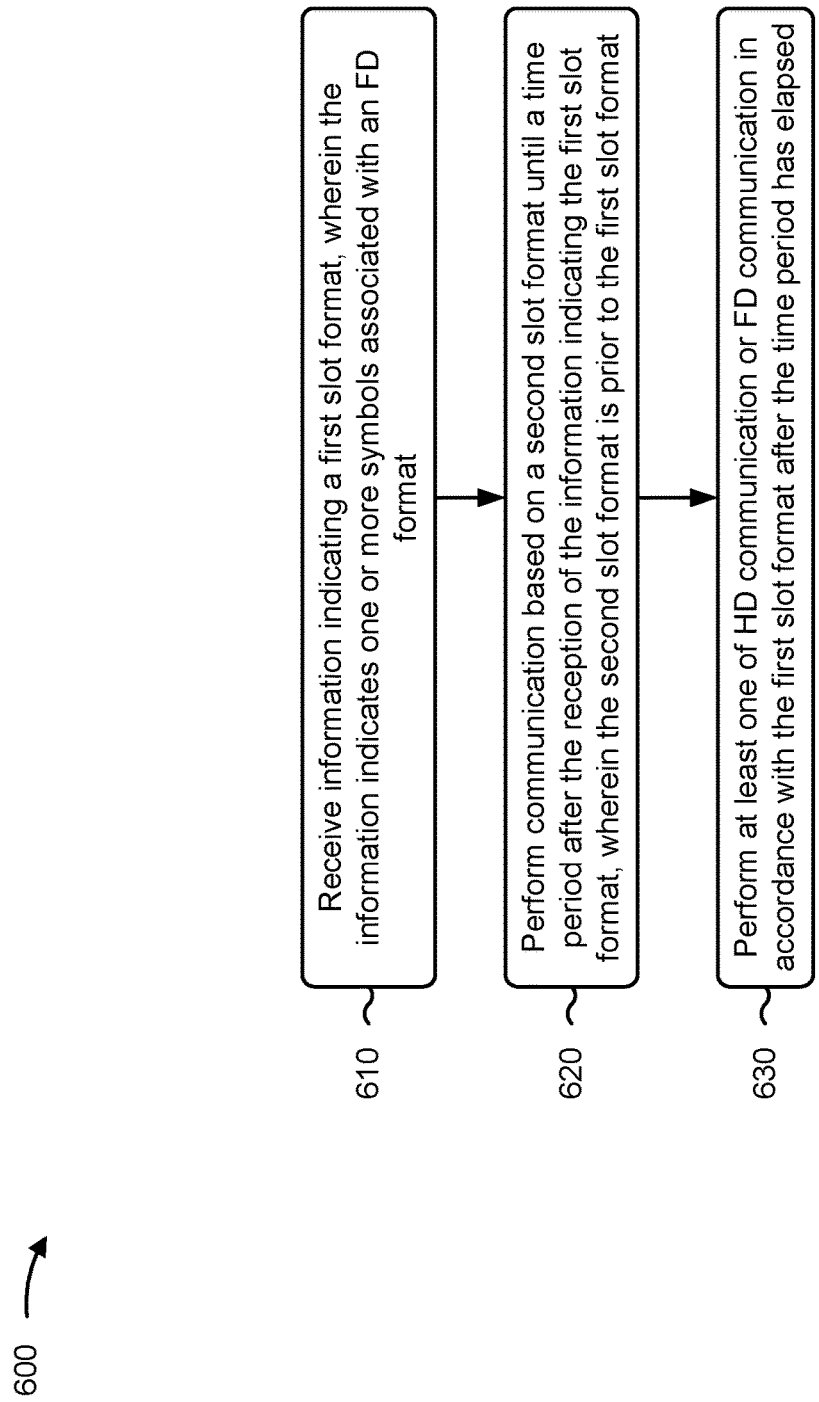
FIGS. 6 and 7 are diagrams illustrating example processes associated with application time for slot format update associated with HD and FD mode switching, in accordance with the present disclosure.

FIG. 6 is a diagram illustrating an example process 600 performed, for example, by a UE, in accordance with the present disclosure. Example process 600 is an example where the UE (e.g., UE 120) performs operations associated with techniques for application time for slot format update associated with HD and FD mode switching.

As shown in FIG. 6, in some aspects, process 600 may include receiving information indicating a first slot format, wherein the information indicates one or more symbols associated with an FD format (block 610). For example, the UE (e.g., using communication manager 140 and/or reception component 802, depicted in FIG. 8) may receive information indicating a first slot format, wherein the information indicates one or more symbols associated with an FD format, as described above.

As further shown in FIG. 6, in some aspects, process 600 may include performing communication based on a second slot format until a time period after the reception of the information indicating the first slot format, wherein the second slot format is prior to the first slot format (block 620). For example, the UE (e.g., using communication manager 140 and/or performance component 808, depicted in FIG. 8) may perform communication based on a second slot format until a time period after the reception of the information indicating the first slot format, wherein the second slot format is prior to the first slot format, as described above.

As further shown in FIG. 6, in some aspects, process 600 may include performing at least one of HD communication or FD communication in accordance with the first slot format after the time period has elapsed (block 630). For example, the UE (e.g., using communication manager 140 and/or performance component 808, depicted in FIG. 8) may perform at least one of HD communication or FD communication in accordance with the first slot format after the time period has elapsed, as described above.

Process 600 may include additional aspects, such as any single aspect or any combination of aspects described below and/or in connection with one or more other processes described elsewhere herein.

In a first aspect, the information indicating the first slot format includes a slot format indicator in a group common DCI message.

In a second aspect, alone or in combination with the first aspect, the information indicating the first slot format is associated with a bandwidth part switch with a slot format change in UE dedicated DCI.

In a third aspect, alone or in combination with one or more of the first and second aspects, the first slot format is applied starting at a slot in which the information indicating the first slot format is received, wherein the one or more symbols associated with the FD format are to be transmitted via one or more slots that occur, in time, before the time period has elapsed, and performing the HD communication further comprises performing the HD communication in the one or more slots based at least in part on the time period not having elapsed.

In a fourth aspect, alone or in combination with one or more of the first through third aspects, the time period is associated with preparing the UE for the FD communication.

In a fifth aspect, alone or in combination with one or more of the first through fourth aspects, the time period is defined as at least one of a first time period associated with a DCI decoding process, a second time period associated with uplink transmission preparation, a third time period associated with preparing the UE for the FD communication, or a fourth time period associated with a bandwidth part switch time.

In a sixth aspect, alone or in combination with one or more of the first through fifth aspects, the time period is selected as a longest time period of the first time period, the second time period, the third time period, or the fourth time period.

In a seventh aspect, alone or in combination with one or more of the first through sixth aspects, performing the communication until the time period has elapsed is in accordance with the second slot format from before the information indicating the first slot format was received.

In an eighth aspect, alone or in combination with one or more of the first through seventh aspects, process 600 includes receiving, from a base station, information configuring the time period.

In a ninth aspect, alone or in combination with one or more of the first through eighth aspects, process 600 includes transmitting capability information indicating a capability relating to the FD communication, wherein the time period is based at least in part on the capability information.

In a tenth aspect, alone or in combination with one or more of the first through ninth aspects, the capability relates to a mode switching latency for an FD mode.

In an eleventh aspect, alone or in combination with one or more of the first through tenth aspects, the mode switching latency is measured as a length of time after receiving the information indicating the first slot format.

In a twelfth aspect, alone or in combination with one or more of the first through eleventh aspects, the mode switching latency is measured from transmission of an acknowledgment associated with the information indicating the first slot format.

In a thirteenth aspect, alone or in combination with one or more of the first through twelfth aspects, process 600 includes transmitting the acknowledgment, wherein the acknowledgment is a UE-specific acknowledgment for the information indicating the first slot format.

In a fourteenth aspect, alone or in combination with one or more of the first through thirteenth aspects, process 600 includes transmitting the acknowledgment on a resource associated with common feedback regarding the information indicating the first slot format.

In a fifteenth aspect, alone or in combination with one or more of the first through fourteenth aspects, the information indicating the first slot format is received on a carrier on which the FD communication and the HD communication are performed, and the time period is measured using one of a first subcarrier spacing associated with a downlink of the FD communication or the HD communication, or a second subcarrier spacing associated with an uplink of the FD communication or the HD communication.

In a sixteenth aspect, alone or in combination with one or more of the first through fifteenth aspects, the information indicating the first slot format is included in DCI received on a first carrier and the FD communication and the HD communication are performed on a second carrier, and the time period is measured using one of a first subcarrier spacing associated with a downlink of the FD communication or the HD communication, a second subcarrier spacing associated with an uplink of the FD communication or the HD communication, or a third subcarrier spacing of the DCI.

In a seventeenth aspect, alone or in combination with one or more of the first through sixteenth aspects, the time period is measured using a smallest or a largest subcarrier spacing of the first subcarrier spacing, the second subcarrier spacing, or the third subcarrier spacing.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
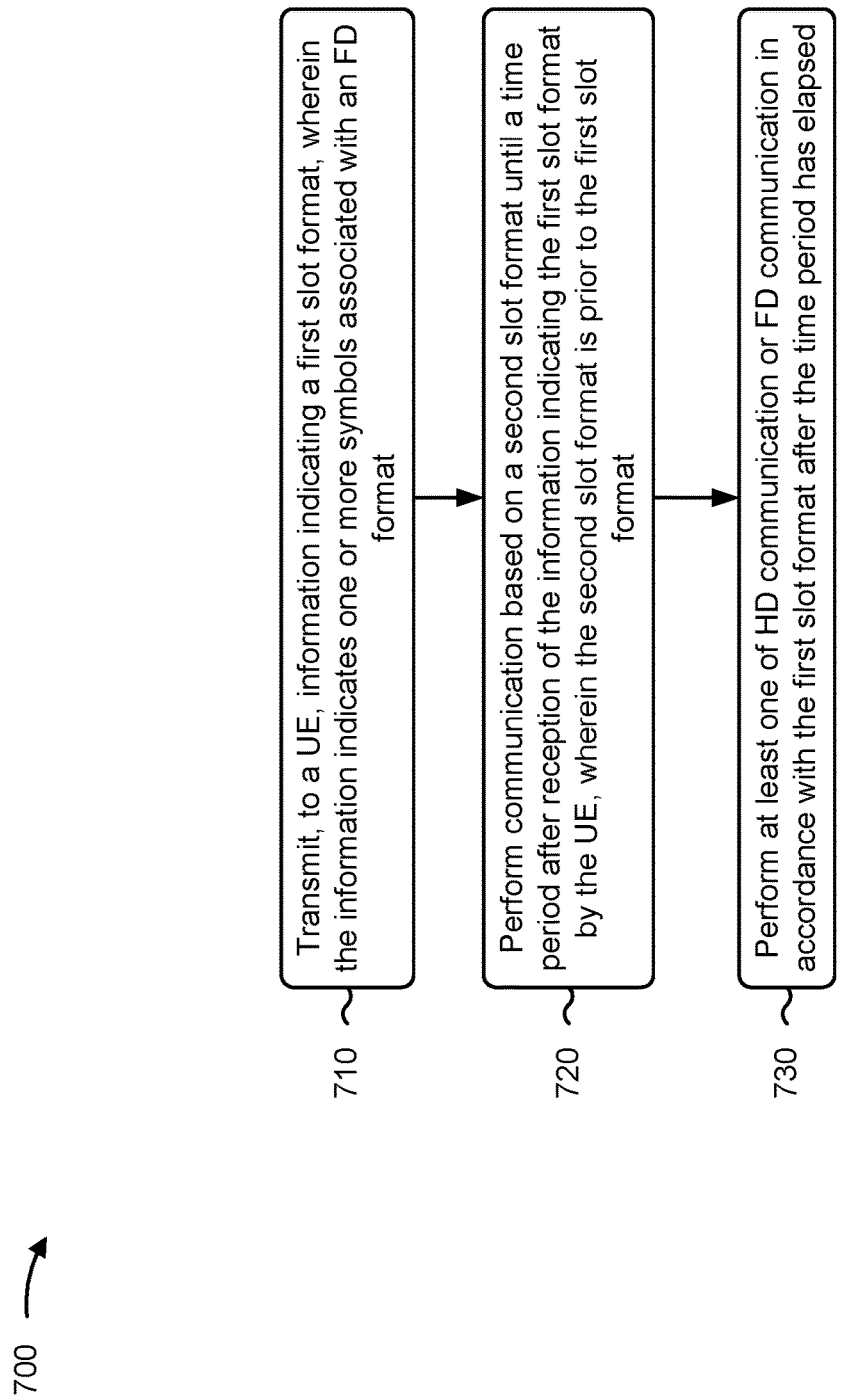

FIG. 7 is a diagram illustrating an example process 700 performed, for example, by a base station, in accordance with the present disclosure. Example process 700 is an example where the base station (e.g., base station 110) performs operations associated with techniques for application time for slot format update associated with HD and FD mode switching.

As shown in FIG. 7, in some aspects, process 700 may include transmitting, to a UE, information indicating a first slot format, wherein the information indicates one or more symbols associated with an FD format (block 710). For example, the base station (e.g., using communication manager 150 and/or transmission component 904, depicted in FIG. 9) may transmit, to a UE, information indicating a first slot format, wherein the information indicates one or more symbols associated with an FD format, as described above.

As further shown in FIG. 7, in some aspects, process 700 may include performing communication based on a second slot format until a time period after reception of the information indicating the first slot format by the UE, wherein the second slot format is prior to the first slot format (block 720). For example, the base station (e.g., using communication manager 150 and/or performance component 908, depicted in FIG. 9) may perform communication based on a second slot format until a time period after reception of the information indicating the first slot format by the UE, wherein the second slot format is prior to the first slot format, as described above.

As further shown in FIG. 7, in some aspects, process 700 may include performing at least one of HD communication or FD communication in accordance with the first slot format after the time period has elapsed (block 730). For example, the base station (e.g., using communication manager 150 and/or performance component 908, depicted in FIG. 9) may perform at least one of half duplex (HD) communication or FD communication in accordance with the first slot format after the time period has elapsed, as described above.

Process 700 may include additional aspects, such as any single aspect or any combination of aspects described below and/or in connection with one or more other processes described elsewhere herein.

In a first aspect, the information indicating the first slot format includes a slot format indicator in a group common DCI message.

In a second aspect, alone or in combination with the first aspect, the information indicating the first slot format is associated with a bandwidth part switch with a slot format change in UE DCI information.

In a third aspect, alone or in combination with one or more of the first and second aspects, the first slot format is applied starting at a slot in which the information indicating the first slot format is received, wherein the one or more symbols associated with the FD format are to be transmitted via one or more slots that occur, in time, before the time period has elapsed, and performing the HD communication further comprises performing the HD communication in the one or more slots based at least in part on the time period not having elapsed.

In a fourth aspect, alone or in combination with one or more of the first through third aspects, the time period is associated with preparing the UE for the FD communication.

In a fifth aspect, alone or in combination with one or more of the first through fourth aspects, the time period is defined as at least one of a first time period associated with a DCI decoding process, a second time period associated with uplink transmission preparation, a third time period associated with preparing the UE for the FD communication, or a fourth time period associated with a bandwidth part switch time.

In a sixth aspect, alone or in combination with one or more of the first through fifth aspects, the time period is selected as a longest time period of the first time period, the second time period, the third time period, or the fourth time period.

In a seventh aspect, alone or in combination with one or more of the first through sixth aspects, performing the HD communication until the time period has elapsed is in accordance with the second slot format from before the information indicating the first slot format was received by the UE.

In an eighth aspect, alone or in combination with one or more of the first through seventh aspects, process 700 includes transmitting information configuring the time period.

In a ninth aspect, alone or in combination with one or more of the first through eighth aspects, process 700 includes receiving capability information indicating a capability relating to the FD communication, wherein the information configuring the time period is based at least in part on the capability information.

In a tenth aspect, alone or in combination with one or more of the first through ninth aspects, the capability relates to a mode switching latency for an FD mode.

In an eleventh aspect, alone or in combination with one or more of the first through tenth aspects, the mode switching latency is measured as a length of time after receiving the information indicating the first slot format.

In a twelfth aspect, alone or in combination with one or more of the first through eleventh aspects, the mode switching latency is measured from transmission of an acknowledgment associated with the information indicating the first slot format.

In a thirteenth aspect, alone or in combination with one or more of the first through twelfth aspects, process 700 includes receiving the acknowledgment, wherein the acknowledgment is a UE-specific acknowledgment for the information indicating the first slot format.

In a fourteenth aspect, alone or in combination with one or more of the first through thirteenth aspects, process 700 includes receiving the acknowledgment on a resource associated with common feedback regarding the information indicating the first slot format.

In a fifteenth aspect, alone or in combination with one or more of the first through fourteenth aspects, the information indicating the first slot format is transmitted on a carrier on which the FD communication and the HD communication are performed, and the time period is measured using one of a first subcarrier spacing associated with a downlink of the FD communication or the HD communication, or a second subcarrier spacing associated with an uplink of the FD communication or the HD communication.

In a sixteenth aspect, alone or in combination with one or more of the first through fifteenth aspects, the information indicating the first slot format is included in DCI transmitted on a first carrier and the FD communication and the HD communication are performed on a second carrier, and the time period is measured using one of a first subcarrier spacing associated with a downlink of the FD communication or the HD communication, a second subcarrier spacing associated with an uplink of the FD communication or the HD communication, or a third subcarrier spacing of the DCI.

In a seventeenth aspect, alone or in combination with one or more of the first through sixteenth aspects, the time period is measured using a smallest or a largest subcarrier spacing of the first subcarrier spacing, the second subcarrier spacing, or the third subcarrier spacing.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
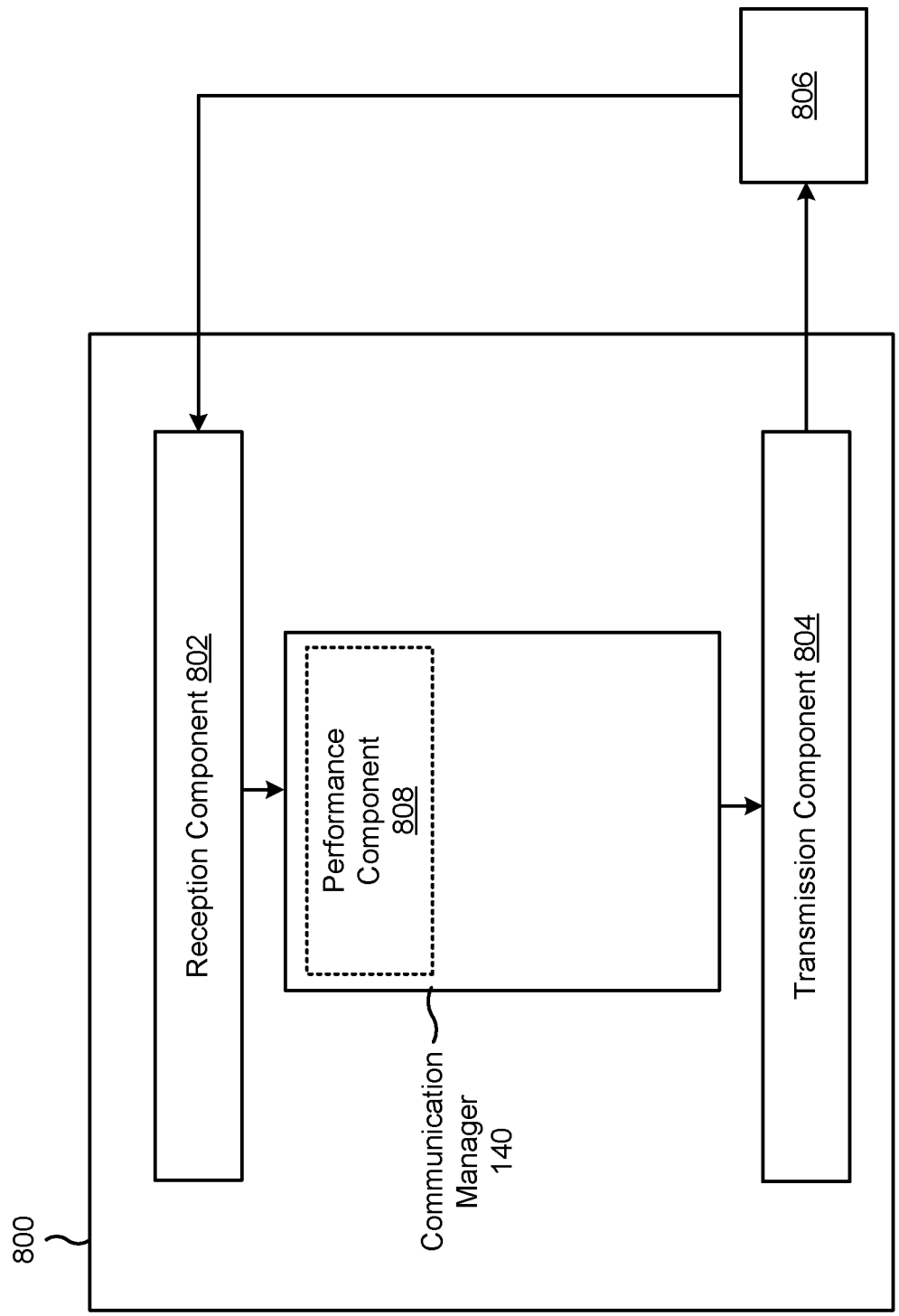
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a performance component 808, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive information indicating a first slot format, wherein the information indicates one or more symbols associated with an FD format. The performance component 808 may perform communication based on a second slot format until a time period after the reception of the information indicating the first slot format, wherein the second slot format is prior to the first slot format. The performance component 808 may perform at least one of HD communication or FD communication in accordance with the first slot format after the time period has elapsed.

The reception component 802 may receive, from a base station, information configuring the time period.

The transmission component 804 may transmit capability information indicating a capability relating to the FD communication, wherein the time period is based at least in part on the capability information.

The transmission component 804 may transmit the acknowledgment, wherein the acknowledgment is a UE-specific acknowledgment for the information indicating the first slot format.

The transmission component 804 may transmit the acknowledgment on a resource associated with common feedback regarding the information indicating the first slot format.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
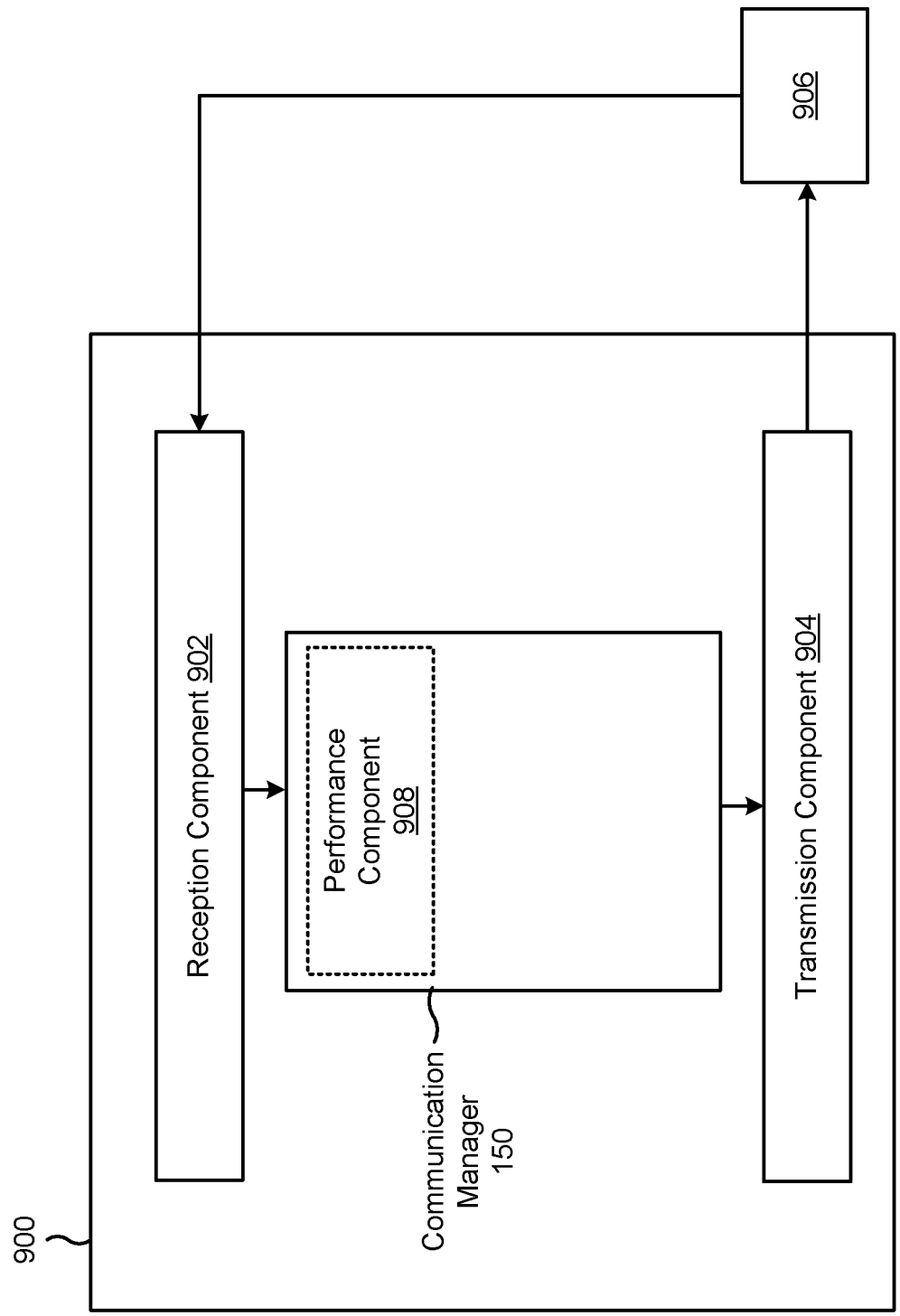

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a performance component 908, among other examples.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, information indicating a first slot format, wherein the information indicates one or more symbols associated with an FD format. The performance component 908 may perform communication based on a second slot format until a time period after reception of the information indicating the first slot format by the UE, wherein the second slot format is prior to the first slot format. The performance component 908 may perform at least one of HD communication or FD communication in accordance with the first slot format after the time period has elapsed.

The transmission component 904 may transmit information configuring the time period.

The reception component 902 may receive capability information indicating a capability relating to the FD communication, wherein the information configuring the time period is based at least in part on the capability information.

The reception component 902 may receive the acknowledgment, wherein the acknowledgment is a UE-specific acknowledgment for the information indicating the first slot format.

The reception component 902 may receive the acknowledgment on a resource associated with common feedback regarding the information indicating the first slot format.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving information indicating a first slot format, wherein the information indicates one or more symbols associated with an FD format; and performing communication based on a second slot format until a time period after the reception of the information indicating the first slot format, wherein the second slot format is prior to the first slot format; and performing at least one of HD communication or FD communication in accordance with the first slot format after the time period has elapsed.

Aspect 2: The method of Aspect 1, wherein the information indicating the first slot format includes a slot format indicator in a group common DCI message.

Aspect 3: The method of one or more of Aspects 1 and 2, wherein the information indicating the first slot format is associated with a bandwidth part switch with a slot format change in UE dedicated downlink control information.

Aspect 4: The method of one or more of Aspects 1 through 3, wherein the first slot format is applied starting at a slot in which the information indicating the first slot format is received, wherein the one or more symbols associated with the FD format are to be transmitted via one or more slots that occur, in time, before the time period has elapsed, and wherein performing the HD communication further comprises: performing the HD communication in the one or more slots based at least in part on the time period not having elapsed.

Aspect 5: The method of Aspect 4, wherein the time period is associated with preparing the UE for the FD communication.

Aspect 6: The method of one or more of Aspects 1 through 5, wherein the time period is defined as at least one of: a first time period associated with a DCI decoding process, a second time period associated with uplink transmission preparation, a third time period associated with preparing the UE for the FD communication, or a fourth time period associated with a bandwidth part switch time.

Aspect 7: The method of Aspect 6, wherein the time period is selected as a longest time period of the first time period, the second time period, the third time period, or the fourth time period.

Aspect 8: The method of one or more of Aspects 1 through 7, wherein performing the communication until the time period has elapsed is in accordance with the second slot format from before the information indicating the first slot format was received.

Aspect 9: The method of one or more of Aspects 1 through 8, further comprising: receiving, from a base station, information configuring the time period.

Aspect 10: The method of one or more of Aspects 1 through 9, further comprising: transmitting capability information indicating a capability relating to the FD communication, wherein the time period is based at least in part on the capability information.

Aspect 11: The method of Aspect 10, wherein the capability relates to a mode switching latency for an FD mode.

Aspect 12: The method of Aspect 11, wherein the mode switching latency is measured as a length of time after receiving the information indicating the first slot format.

Aspect 13: The method of Aspect 11, wherein the mode switching latency is measured from transmission of an acknowledgment associated with the information indicating the first slot format.

Aspect 14: The method of Aspect 13, further comprising: transmitting the acknowledgment, wherein the acknowledgment is a UE-specific acknowledgment for the information indicating the first slot format.

Aspect 15: The method of Aspect 13, further comprising: transmitting the acknowledgment on a resource associated with common feedback regarding the information indicating the first slot format.

Aspect 16: The method of one or more of Aspects 1 through 15, wherein the information indicating the first slot format is received on a carrier on which the FD communication and the HD communication are performed, and wherein the time period is measured using one of: a first subcarrier spacing associated with a downlink of the FD communication or the HD communication, or a second subcarrier spacing associated with an uplink of the FD communication or the HD communication.

Aspect 17: The method of one or more of Aspects 1 through 16, wherein the information indicating the first slot format is included in DCI received on a first carrier and the FD communication and the HD communication are performed on a second carrier, and wherein the time period is measured using one of: a first subcarrier spacing associated with a downlink of the FD communication or the HD communication, a second subcarrier spacing associated with an uplink of the FD communication or the HD communication, or a third subcarrier spacing of the DCI.

Aspect 18: The method of Aspect 17, wherein the time period is measured using a smallest or a largest subcarrier spacing of the first subcarrier spacing, the second subcarrier spacing, or the third subcarrier spacing.

Aspect 19: A method of wireless communication performed by a base station, comprising: transmitting, to a UE, information indicating a first slot format, wherein the information indicates one or more symbols associated with an FD format; and performing communication based on a second slot format until a time period after reception of the information indicating the first slot format by the UE, wherein the second slot format is prior to the first slot format; and performing at least one of HD communication or FD communication in accordance with the first slot format after the time period has elapsed.

Aspect 20: The method of Aspect 19, wherein the information indicating the first slot format includes a slot format indicator in a group common DCI message.

Aspect 21: The method of one or more of Aspects 19 and 20, wherein the information indicating the first slot format is associated with a bandwidth part switch with a slot format change in UE dedicated downlink control information.

Aspect 22: The method of one or more of Aspects 19 through 21, wherein the first slot format is applied starting at a slot in which the information indicating the first slot format is received, wherein the one or more symbols associated with the FD format are to be transmitted via one or more slots that occur, in time, before the time period has elapsed, and wherein performing the HD communication further comprises: performing the HD communication in the one or more slots based at least in part on the time period not having elapsed.

Aspect 23: The method of Aspect 22, wherein the time period is associated with preparing the UE for the FD communication.

Aspect 24: The method of one or more of Aspects 19 through 23, wherein the time period is defined as at least one of: a first time period associated with a DCI decoding process, a second time period associated with uplink transmission preparation, a third time period associated with preparing the UE for the FD communication, or a fourth time period associated with a bandwidth part switch time.

Aspect 25: The method of Aspect 24, wherein the time period is selected as a longest time period of the first time period, the second time period, the third time period, or the fourth time period.

Aspect 26: The method of one or more of Aspects 19 through 25, wherein performing the HD communication until the time period has elapsed is in accordance with the second slot format from before the information indicating the first slot format was received by the UE.

Aspect 27: The method of one or more of Aspects 19 through 26, further comprising: transmitting information configuring the time period.

Aspect 28: The method of Aspect 27, further comprising: receiving capability information indicating a capability relating to the FD communication, wherein the information configuring the time period is based at least in part on the capability information.

Aspect 29: The method of Aspect 28, wherein the capability relates to a mode switching latency for an FD mode.

Aspect 30: The method of Aspect 29, wherein the mode switching latency is measured as a length of time after receiving the information indicating the first slot format.

Aspect 31: The method of Aspect 29, wherein the mode switching latency is measured from transmission of an acknowledgment associated with the information indicating the first slot format.

Aspect 32: The method of Aspect 31, further comprising: receiving the acknowledgment, wherein the acknowledgment is a UE-specific acknowledgment for the information indicating the first slot format.

Aspect 33: The method of Aspect 31, further comprising: receiving the acknowledgment on a resource associated with common feedback regarding the information indicating the first slot format.

Aspect 34: The method of one or more of Aspects 19 through 33, wherein the information indicating the first slot format is transmitted on a carrier on which the FD communication and the HD communication are performed, and wherein the time period is measured using one of: a first subcarrier spacing associated with a downlink of the FD communication or the HD communication, or a second subcarrier spacing associated with an uplink of the FD communication or the HD communication.

Aspect 35: The method of one or more of Aspects 19 through 34, wherein the information indicating the first slot format is included in DCI transmitted on a first carrier and the FD communication and the HD communication are performed on a second carrier, and wherein the time period is measured using one of: a first subcarrier spacing associated with a downlink of the FD communication or the HD communication, a second subcarrier spacing associated with an uplink of the FD communication or the HD communication, or a third subcarrier spacing of the DCI.

Aspect 36: The method of Aspect 35, wherein the time period is measured using a smallest or a largest subcarrier spacing of the first subcarrier spacing, the second subcarrier spacing, or the third subcarrier spacing.

Aspect 37: An apparatus for wireless communication at a device, comprising a processor; memory coupled with the processor; and instructions stored in the memory and executable by the processor to cause the apparatus to perform the method of one or more of Aspects 1 through 18.

Aspect 38: A device for wireless communication, comprising a memory and one or more processors coupled to the memory, the one or more processors configured to perform the method of one or more of Aspects 1 through 18.

Aspect 39: An apparatus for wireless communication, comprising at least one means for performing the method of one or more of Aspects 1 through 18.

Aspect 40: A non-transitory computer-readable medium storing code for wireless communication, the code comprising instructions executable by a processor to perform the method of one or more of Aspects 1 through 18.

Aspect 41: A non-transitory computer-readable medium storing a set of instructions for wireless communication, the set of instructions comprising one or more instructions that, when executed by one or more processors of a device, cause the device to perform the method of one or more of Aspects 1 through 18.

Aspect 42: An apparatus for wireless communication at a device, comprising a processor; memory coupled with the processor; and instructions stored in the memory and executable by the processor to cause the apparatus to perform the method of one or more of Aspects 19 through 36.

Aspect 43: A device for wireless communication, comprising a memory and one or more processors coupled to the memory, the one or more processors configured to perform the method of one or more of Aspects 19 through 36.

Aspect 44: An apparatus for wireless communication, comprising at least one means for performing the method of one or more of Aspects 19 through 36.

Aspect 45: A non-transitory computer-readable medium storing code for wireless communication, the code comprising instructions executable by a processor to perform the method of one or more of Aspects 19 through 36.

Aspect 46: A non-transitory computer-readable medium storing a set of instructions for wireless communication, the set of instructions comprising one or more instructions that, when executed by one or more processors of a device, cause the device to perform the method of one or more of Aspects 19 through 36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving information indicating an update to a first slot format from a second slot format, wherein the information indicates one or more symbols associated with a full duplex (FD) format;
   performing, after receiving the information indicating to update to the first slot format, communication in accordance with the second slot format until a time period has elapsed after the reception of the information indicating the first slot format; and
   performing at least one of half duplex (HD) communication or FD communication in accordance with the first slot format after the time period has elapsed.

2. The method of claim 1, wherein the information indicating the first slot format includes a slot format indicator in a group common downlink control information message.

3. The method of claim 1, wherein the information indicating the first slot format is associated with a bandwidth part switch with a slot format change in UE dedicated downlink control information.

4. The method of claim 1, wherein:
   the first slot format is applied starting at a slot in which the information indicating the first slot format is received,
   the one or more symbols associated with the FD format are to be transmitted via one or more slots that occur, in time, before the time period has elapsed, and
   performing the HD communication further comprises:
      performing the HD communication in the one or more slots having the first slot format based at least in part on the time period not having elapsed.

5. The method of claim 4, wherein the time period is associated with preparing the UE for the FD communication.

6. The method of claim 1, wherein the time period is defined as at least one of:
   a first time period associated with a downlink control information decoding process,
   a second time period associated with uplink transmission preparation,
   a third time period associated with preparing the UE for the FD communication, or
   a fourth time period associated with a bandwidth part switch time.

7. The method of claim 6, wherein the time period is selected as a longest time period of the first time period, the second time period, the third time period, or the fourth time period.

8. The method of claim 1, wherein performing the communication until the time period has elapsed is in accordance with the second slot format from before the information indicating the first slot format was received.

9. The method of claim 1, further comprising:
   receiving, from a network entity, information configuring the time period.

10. The method of claim 1, further comprising:
    transmitting capability information indicating a capability relating to the FD communication, wherein the time period is based at least in part on the capability information.

11. The method of claim 10, wherein the capability relates to a mode switching latency for an FD mode.

12. The method of claim 11, wherein the mode switching latency is measured as a length of time after receiving the information indicating the first slot format.

13. The method of claim 11, wherein the mode switching latency is measured from transmission of an acknowledgment associated with the information indicating the first slot format.

14. The method of claim 13, further comprising:
    transmitting the acknowledgment, wherein the acknowledgment is a UE-specific acknowledgment for the information indicating the first slot format.

15. The method of claim 13, further comprising:
    transmitting the acknowledgment on a resource associated with common feedback regarding the information indicating the first slot format.

16. The method of claim 1, wherein the information indicating the first slot format is received on a carrier on which the FD communication and the HD communication are performed, and wherein the time period is measured using one of:
    a first subcarrier spacing associated with a downlink of the FD communication or the HD communication, or
    a second subcarrier spacing associated with an uplink of the FD communication or the HD communication.

17. The method of claim 1, wherein the information indicating the first slot format is included in downlink control information received on a first carrier and the FD communication and the HD communication are performed on a second carrier, and wherein the time period is measured using one of:
    a first subcarrier spacing associated with a downlink of the FD communication or the HD communication,
    a second subcarrier spacing associated with an uplink of the FD communication or the HD communication, or
    a third subcarrier spacing of the downlink control information.

18. The method of claim 17, wherein the time period is measured using a smallest or a largest subcarrier spacing of the first subcarrier spacing, the second subcarrier spacing, or the third subcarrier spacing.

19. A method of wireless communication performed by a network entity, comprising:
    transmitting, to a user equipment (UE), information indicating an update to a first slot format from a second slot format, wherein the information indicates one or more symbols associated with a full duplex (FD) format;
    performing, after transmitting the information indicating to update to the first slot format, communication in accordance with the second slot format until a time period has elapsed after reception of the information indicating the first slot format by the UE; and
    performing at least one of half duplex (HD) communication or FD communication in accordance with the first slot format after the time period has elapsed.

20. The method of claim 19, wherein the information indicating the first slot format includes a slot format indicator in a group common downlink control information message.

21. The method of claim 19, wherein:
    the first slot format is applied starting at a slot in which the information indicating the first slot format is received,
    the one or more symbols associated with the FD format are to be transmitted via one or more slots that occur, in time, before the time period has elapsed, and
    performing the HD communication further comprises:
       performing the HD communication in the one or more slots having the first slot format based at least in part on the time period not having elapsed.

22. The method of claim 19, wherein the time period is defined as at least one of:
- a first time period associated with a downlink control information decoding process,
- a second time period associated with uplink transmission preparation,
- a third time period associated with preparing the UE for the FD communication, or
- a fourth time period associated with a bandwidth part switch time.

23. The method of claim 19, wherein performing the HD communication until the time period has elapsed is in accordance with the second slot format from before the information indicating the first slot format was received by the UE.

24. The method of claim 19, further comprising: transmitting information configuring the time period.

25. An apparatus of a user equipment (UE) for wireless communication, comprising:
- one or more memories; and
- one or more processors, coupled to the one or more memories, configured to:
  - receive information indicating an update to a first slot format from a second slot format, wherein the information indicates one or more symbols associated with a full duplex (FD) format;
  - perform, after receiving the information indicating to update to the first slot format, communication in accordance with the second slot format until a time period has elapsed after the reception of the information indicating the first slot format; and
  - perform at least one of half duplex (HD) communication or FD communication in accordance with the first slot format after the time period has elapsed.

26. The apparatus of claim 25, wherein the information indicating the first slot format includes a slot format indicator in a group common downlink control information message.

27. The apparatus of claim 25, wherein the information indicating the first slot format is associated with a bandwidth part switch with a slot format change in UE dedicated downlink control information.

28. An apparatus of a base station network entity for wireless communication, comprising:
- one or more memories; and
- one or more processors, coupled to the one or more memories, configured to:
  - transmit, to a user equipment (UE), information indicating an update to a first slot format from a second slot format, wherein the information indicates one or more symbols associated with a full duplex (FD) format;
  - perform, after transmitting the information indicating to update to the first slot format, communication in accordance with the second slot format until a time period has elapsed after reception of the information indicating the first slot format by the UE; and
  - perform at least one of half duplex (HD) communication or FD communication in accordance with the first slot format after the time period has elapsed.

29. The apparatus of claim 28, wherein the information indicating the first slot format includes a slot format indicator in a group common downlink control information message.

30. The apparatus of claim 28, wherein the information indicating the first slot format is associated with a bandwidth part switch with a slot format change in UE dedicated downlink control information.

\* \* \* \* \*